United States Patent [19]

Reasoner

[11] Patent Number: 5,737,973
[45] Date of Patent: Apr. 14, 1998

[54] TRAILING COVER TO CAPTURE CORE ELEMENT

[75] Inventor: Michael Reasoner, Grand Blanc, Mich.

[73] Assignee: Teleflex Incorporated, Plymouth Meeting, Pa.

[21] Appl. No.: 747,542

[22] Filed: Nov. 12, 1996

[51] Int. Cl.⁶ .................................................. F16C 1/10
[52] U.S. Cl. .............................. 74/502.4; 74/502.6
[58] Field of Search ........................ 74/500.5–503

[56] References Cited

U.S. PATENT DOCUMENTS

| | | |
|---|---|---|
| 1,752,817 | 1/1930 | Spohr . |
| 2,029,874 | 2/1936 | Kimball . |
| 2,071,383 | 2/1937 | Barrett et al. . |
| 2,947,194 | 8/1960 | Shimanackas . |
| 3,605,520 | 9/1971 | Lorenz et al. . |
| 4,031,773 | 6/1977 | Marechal ..................... 74/501.5 R |
| 4,095,483 | 6/1978 | Sargeant ............................ 74/502.4 |
| 4,245,713 | 1/1981 | Mochida et al. ............... 74/502.4 X |
| 4,297,912 | 11/1981 | Marechal ..................... 74/502.4 X |
| 4,402,160 | 9/1983 | Brusasco . |
| 4,495,881 | 1/1985 | Teraura . |
| 4,513,680 | 4/1985 | Teraura . |
| 4,790,206 | 12/1988 | Thomas ............................ 74/502.4 |
| 4,884,468 | 12/1989 | Muramatsu et al. ............. 74/502.4 |
| 4,887,929 | 12/1989 | Hale .............................. 74/502.4 X |
| 5,010,780 | 4/1991 | Hatfield ..................... 74/501.5 R |
| 5,191,866 | 3/1993 | Tosdale ......................... 74/502.4 X |
| 5,241,879 | 9/1993 | Kelley . |
| 5,245,724 | 9/1993 | Sacks ............................... 74/505 X |
| 5,277,080 | 1/1994 | Roelle ......................... 74/501.5 R |

FOREIGN PATENT DOCUMENTS

| | | | |
|---|---|---|---|
| 1096590 | 6/1955 | France ............................. 74/502.4 |
| 2418741 | 9/1979 | France ............................. 74/502.4 |
| 2-203008 | 8/1990 | Japan .............................. 74/502.4 |
| 264397 | 1/1950 | Switzerland . |

*Primary Examiner*—Vinh T. Luong
*Attorney, Agent, or Firm*—Howard & Howard

[57] ABSTRACT

A motion transmitting remote control assembly (10) for transmitting motion in a curved path comprising a flexible core element (12) having first and second ends and movably supported by a conduit (14) having a first end, a terminal (16) attached to the first end of the core element (12), an end fitting (18) attached to the first end of the conduit (14) and defining a guideway (20) for guiding the terminal (16) during to and from movement of an extended length of the core element (12) in the guideway (20), and a collar (22) in sliding relationship with the guideway (20). The core element (12) has a core cross section and the guideway (20) has a guideway cross section. The guideway cross section is larger than the core cross section. The collar (22) slides between the terminal (16) and the end fitting (18) occupying a first portion of a difference in the core cross section and the guideway cross section to prevent buckling of the extended length of the core element (12) extending from the end fitting (18) to the terminal (16).

11 Claims, 2 Drawing Sheets

TRAILING COVER TO CAPTURE CORE ELEMENT

TECHNICAL FIELD

This invention relates to a motion transmitting remote control assembly of the type for transmitting motion in a curved path by a flexible motion transmitting core element as used in push-pull assemblies.

BACKGROUND OF THE INVENTION

The motion transmitting control assembly for transmitting motion in a curved path requires sufficient space to allow a core element to be pushed and pulled. When the core element is pushed the cable requires sufficient support to prevent buckling.

The prior art teaches the use of a swivel tube and rod wherein the swivel tube prevents buckling of the core element as the rod is extended. U.S. Pat. No. 5,241,879 granted to Kelley and assigned to Teleflex Incorporated discloses such an assembly. As the rod extends from the swivel tube, the flexible core element attached to the rod is drawn into the swivel tube. Typically, the core element can buckle or become wavelike in the swivel tube because the swivel tube has a diameter that is much larger than the diameter of the core element in order to accommodate the rod. Although the prior art assembly functions satisfactorily, there is an opportunity for improvement with respect to the amount of space taken up by the assembly, and the amount of buckling by the core element between the end of the conduit and the member to which the core element is attached.

SUMMARY OF THE INVENTION AND ADVANTAGES

A motion transmitting remote control assembly for transmitting motion in a curved path comprising a flexible core element having an extended length and having first and second ends, a terminal attached to the first end of the core element, a conduit having first and second ends and movably supporting the core element, and an end fitting attached to the first end of the conduit and defining a guideway for guiding the terminal during to and from movement of the extended length of the core element. The core has a core cross section, the guideway has a guideway cross section, and the terminal has a terminal cross section. The guideway cross section and the terminal cross section are larger than the core cross section. The assembly is characterized by a collar in sliding relationship with the guideway between the terminal and the end fitting for occupying a first portion of the difference in cross section between the core cross section and the guideway cross section to prevent buckling of the extended length of the core element as it extends from the end fitting to the terminal.

Accordingly, the subject invention provides a motion transmitting remote control assembly wherein buckling of the core element is minimized between the end of the conduit and the member to which the core element is attached.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a motion transmitting remote control assembly for transmitting motion in a curved path is generally shown at 10.

The assembly 10 comprises a flexible core element 12 for transmitting motion in a curved path having first and second ends and having a core cross section. Specifically, the core element 12 has an extended length extending from the first end. More specifically, the core element 12 is either a solid metal wire, made of stranded wire filaments, or made of a similar arrangement of wire. A conduit 14 having first and second ends movably supports the core element 12. The conduit 14 comprises an inner tubular member surrounded by wires or filaments about a long lead which are in turn surrounded by a plastic casing extruded about the wire.

Figure 1:
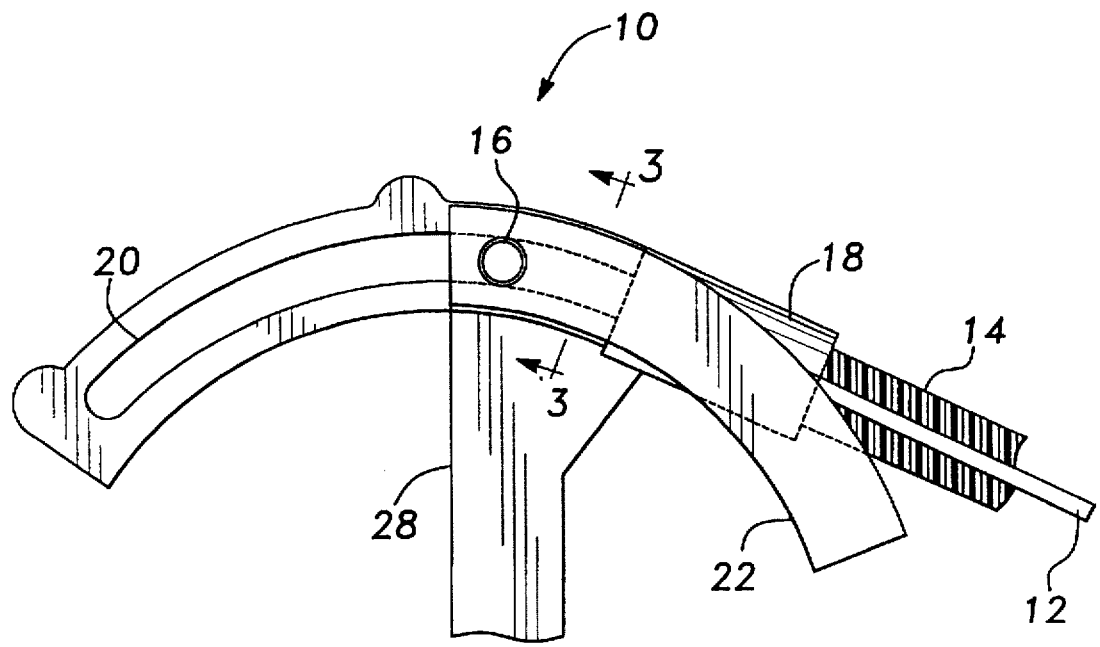
FIG. 1 is a top view.
Figure 2:
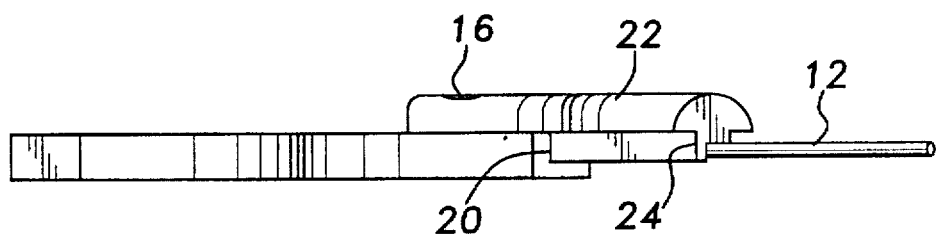
FIG. 2 is a simplified view showing the guideway and the terminal of the subject motion transmitting assembly.
Figure 3:
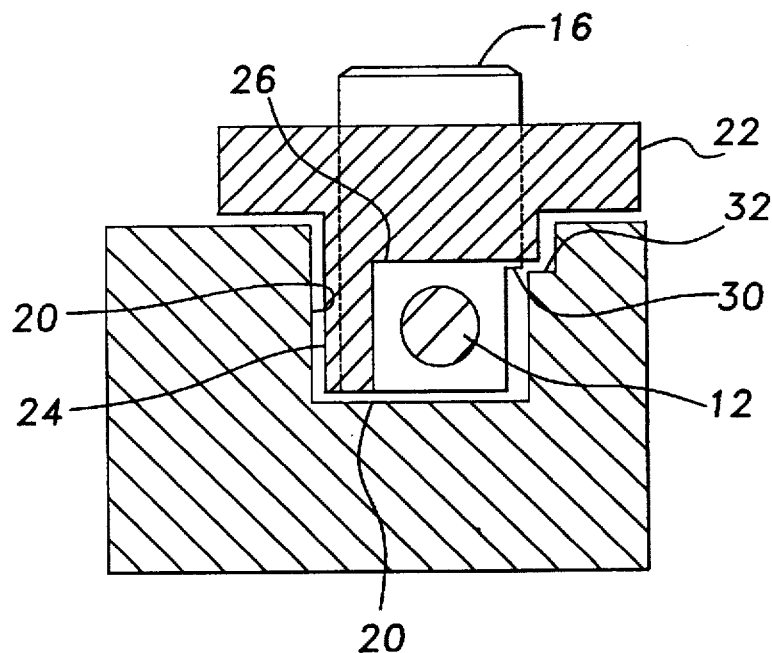
FIG. 3 is a cross sectional view taken along line 3—3 of FIG. 1.
Figure 4:
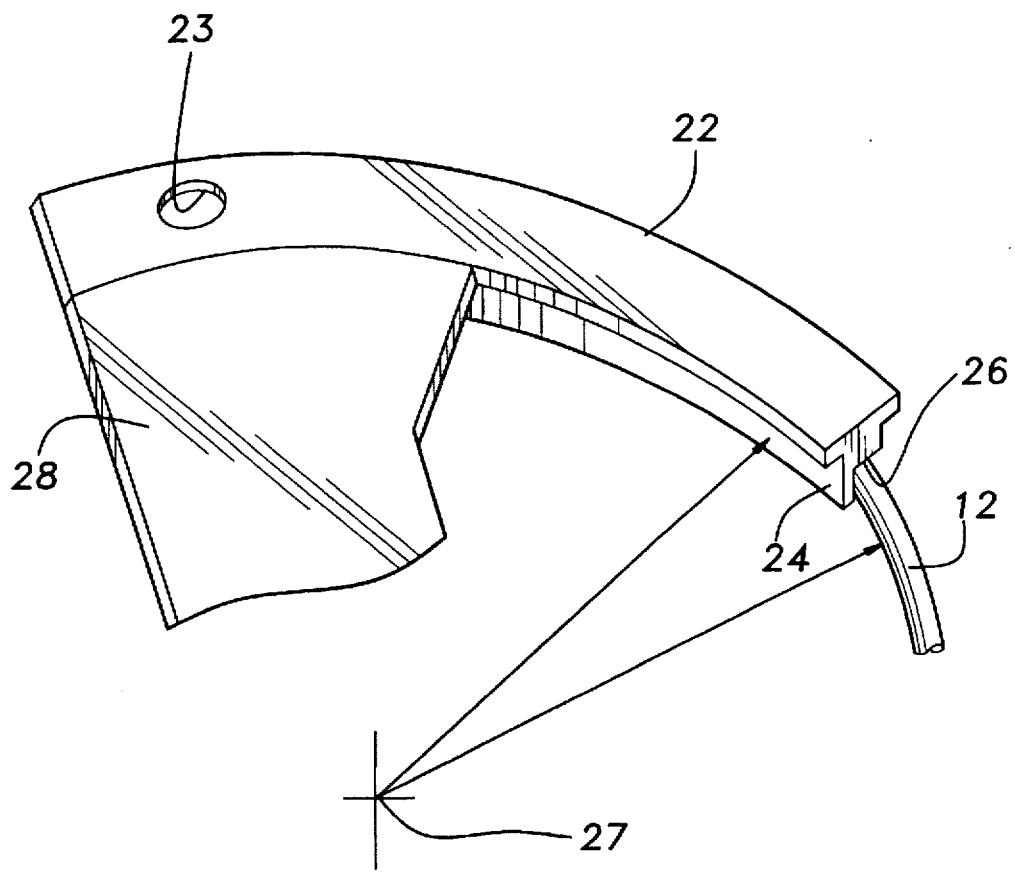
FIG. 4 is a simplified view showing the collar of the subject motion transmitting assembly.

A terminal 16 attaches to the first end of the core element 12. As viewed in FIG. 3, the terminal 16 has a terminal cross section larger than the cross section of the core element 12. The extended length of the core element 12 extends from the first end of the conduit 14 to the terminal 16. An end fitting 18 attaches to the first end of the conduit 14 and defines a guideway 20 having a guideway cross section larger than the core cross section for guiding the terminal 16 along the guideway 20 during to and from movement of the extended length of the core element 12. The conduit 16 extends tangentially from the guideway 20.

The assembly 10 is characterized by a collar 22 in sliding relationship with the guideway 20 between the terminal 16 and the end fitting 18. The collar 22 includes a tongue 24 extending into the guideway 20 to occupy the first portion of the difference in cross section. The collar 22 via tongue 24, therefore, occupies a first portion of the difference in cross section between the core 12 and the guideway 20 to prevent buckling of the extended length of the core element 12 extending from the end fitting 18 to the terminal 16. The guideway 20 has a width and the terminal 16 has a width. The width of the terminal 16 substantially fills the width of the guideway 20 whereby the guideway 20 engages and guides the terminal 16. The collar 22 is attached to the terminal 16 and extends in a direction extending from the terminal 16 generally toward the conduit 14. The terminal 16 comprises a pin and the collar 22 defines a hole 23 in the collar 22 surrounding the pin for attaching the pin to the collar 22.

Further, the collar 22 includes a core support projection 26 extending transversely to the tongue 24 and into a second portion of the difference in cross section between the core 12 and guideway 20 to prevent buckling of the extended length of the core element 12 as it extends from the end fitting 18 to the terminal 16 in a direction transverse to the support projection 26 provided by the tongue 24. The guideway 20 and the tongue 24 extend in an arc about a center 27. The tongue 24 is disposed closer $r_1$ to the center 27 than the core element 12 at $r_2$.

Furthermore, the collar 22 includes a retaining means for retaining the collar 22 in sliding engagement with the end fitting 18. The collar 22 attaches to a gear selection mechanism 28. The pin 16 surrounded by the collar 22 has a relief 30 that is opposite to the tongue 24. The guideway 20 includes a shoulder 32 disposed under the relief 30 of the pin. The relief 30 of the pin rests on the shoulder 32 as it slideably moves along the guideway 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) for transmitting motion and comprising:

a flexible core element (12) for transmitting motion and having a core cross section;

a terminal (16) attached to said core element (12) for movement with said core element (12), said terminal (16) having a terminal cross section larger than the said core cross section;

a conduit (14) movably supporting said core element;

said core element (12) having an extended length extending from said conduit (14) to said terminal (16);

an end fitting (18) attached to said conduit (14) and defining a guideway (20) having a guideway cross section larger than said cross section of said core element (12) for guiding said terminal (16) along said guideway (20) during to and from movement of said extended length of said core element (12);

said assembly including a collar (22) in sliding relationship with said guideway (20) along with said core element (12) between said terminal (16) and said end fitting (18) for occupying a first portion (24) of the difference in cross section between said core element (12) and guideway cross sections along said core element (12) between said terminal (16) and said end fitting (18) to prevent buckling of said extended length of said core element (12) as said core element (12) extends from said end fitting (18) to said terminal (16).

2. An assembly (10) as set forth in claim 1 wherein said collar (22) is attached to said terminal (16) and extends in a direction extending from said terminal (16) generally toward said conduit (14).

3. An assembly (10) as set forth in claim 2 including retaining means for retaining said collar (22) in sliding engagement with said end fitting (18).

4. An assembly (10) as set forth in claim 3 wherein said collar (22) includes a tongue (24) extending into said guideway (20) to occupy said first portion.

5. An assembly (10) as set forth in claim 4 wherein said terminal (16) comprises a pin and said collar (22) defines a hole (23) in said collar (22) surrounding said pin for attaching said pin to said collar (22).

6. An assembly (10) as set forth in claim 4 wherein said guideway (20) has a width and said terminal (16) has a width and substantially fills said width of said guideway (20) whereby said guideway (20) engages and guides said terminal (16).

7. A motion transmitting remote control assembly (10) for transmitting motion and comprising:

a flexible core element (12) for transmitting motion and having a core cross section;

a terminal (16) attached to said core element (12) for movement with said core element (12), said terminal (16) having a terminal cross section larger than the said core cross section;

a conduit (14) movably supporting said core element;

said core element (12) having an extended length extending from said conduit (14) to said terminal (16);

an end fitting (18) attached to said conduit (14) and defining a guideway (20) having a guideway cross section larger than said cross section of said core element (12) for guiding said terminal (16) along said guideway (20) during to and from movement of said extended length of said core element (12);

said assembly including a collar (22) in sliding relationship with said guideway (20) along with said core element (12) between said terminal (16) and said end fitting (18) for occupying a first portion (24) of the difference in cross section between said core element (12) and guideway cross sections along said core element (12) between said terminal (16) and said end fitting (18) to prevent buckling of said extended length of said core element (12) as said core element (12) extends from said end fitting (18) to said terminal (16), said collar (22) being attached to said terminal (16) and extending in a direction extending from said terminal (16) generally toward said conduit (14), a retaining means for retaining said collar (22) in sliding engagement with said end fitting (18), said collar (22) including a tongue (24) extending into said guideway (20) to occupy said first portion, said collar (22) including a core support projection (26) extending transversely to said tongue (24) and into a second portion of the difference in cross section between said core (12) and guideway cross sections to prevent buckling of said extended length of said core element (12) as said core element (12) extends from said end fitting (18) to said terminal (16) in a direction transverse to the support provided by said tongue (24).

8. A motion transmitting remote control assembly (10) for transmitting motion and comprising:

a flexible core element (12) for transmitting motion and having a core cross section;

a terminal (16) attached to said core element (12) for movement with said core element (12), said terminal (16) having a terminal cross section larger than the said core cross section;

a conduit (14) movably supporting said core element;

said core element (12) having an extended length extending from said conduit (14) to said terminal (16);

an end fitting (18) attached to said conduit (14) and defining a guideway (20) having a guideway cross section larger than said cross section of said core element (12) for guiding said terminal (16) along said guideway (20) during to and from movement of said extended length of said core element (12);

said assembly including a collar (22) in sliding relationship with said guideway (20) along with said core element (12) between said terminal (16) and said end fitting (18) for occupying a first portion (24) of the difference in cross section between said core element (12) and guideway cross sections along said core element (12) between said terminal (16) and said end fitting (18) to prevent buckling of said extended length of said core element (12) as said core element (12) extends from said end fitting (18) to said terminal (16), said collar (22) being attached to said terminal (16) and extending in a direction extending from said terminal (16) generally toward said conduit (14), a retaining means for retaining said collar (22) in sliding engagement with said end fitting (18), said collar (22) including a tongue (24) extending into said guideway (20) to occupy said first portion, said guideway (20) extending in an arc about a center (27) and said tongue (24) extending in an arc ($r_1$) about said center (27).

9. An assembly (10) as set forth in claim 8 wherein said tongue (24) is disposed closer to said center (27) of said arc than said core element (12) at ($r_2$).

10. An assembly (10) as set forth in claim 9 wherein said conduit (14) extends tangentially from said guideway (20).

11. A motion transmitting remote control assembly (10) for transmitting motion and comprising:

- a flexible core element (12) for transmitting motion and having a core cross section;
- a terminal (16) attached to said core element (12) for movement with said core element (12), said terminal (16) having a terminal cross section larger than the said core cross section;
- a conduit (14) movably supporting said core element;
- said core element (12) having an extended length extending from said conduit (14) to said terminal (16);
- an end fitting (18) attached to said conduit (14) and defining a guideway (20) having a guideway cross section larger than said cross section of said core element (12) for guiding said terminal (16) along said guideway (20) during to and from movement of said extended length of said core element (12);
- said assembly including a collar (22) in sliding relationship with said guideway (20) along with said core element (12) between said terminal (16) and said end fitting (18) for occupying a first portion (24) of the difference in cross section between said core element (12) and guideway cross sections along said core element (12) between said terminal (16) and said end fitting (18) to prevent buckling of said extended length of said core element (12) as said core element (12) extends from said end fitting (18) to said terminal (16), said collar (22) being attached to said terminal (16) and extending in a direction extending from said terminal (16) generally toward said conduit (14), a retaining means for retaining said collar (22) in sliding engagement with said end fitting (18), said collar (22) including a tongue (24) extending into said guideway (20) to occupy said first portion, said terminal (16) comprising a pin and said collar (22) defines a hole (23) in said collar (22) surrounding said pin for attaching said pin to said collar (22), said pin including a relief (30) opposite to said tongue (24) and said guideway (20) including a shoulder (32) disposed under said relief (30).

* * * * *